(12) United States Patent
Sasabe et al.

(10) Patent No.: US 7,735,307 B2
(45) Date of Patent: Jun. 15, 2010

(54) ANNULAR CONCENTRIC-LAY BEAD CORD

(75) Inventors: Hiroshi Sasabe, Tochigi (JP); Hitoshi Wakahara, Tochigi (JP); Kenichi Okamoto, Hyogo (JP)

(73) Assignees: Sumitomo (SEI) Steel Wire Corp., Hyogo (JP); Sumitomo Electric Tochigi Co., Ltd., Tochigi (JP)

( * ) Notice: Subject to any disclaimer, the term of this patent is extended or adjusted under 35 U.S.C. 154(b) by 503 days.

(21) Appl. No.: 11/629,490

(22) PCT Filed: Jul. 1, 2005

(86) PCT No.: PCT/JP2005/012227

§ 371 (c)(1),
(2), (4) Date: Jul. 12, 2007

(87) PCT Pub. No.: WO2006/004054

PCT Pub. Date: Jan. 12, 2006

(65) Prior Publication Data

US 2007/0289686 A1   Dec. 20, 2007

(30) Foreign Application Priority Data

| Jul. 5, 2004 | (JP) | ............................ 2004-198329 |
| Jul. 30, 2004 | (JP) | ............................ 2004-224303 |
| Jun. 17, 2005 | (JP) | ............................ 2005-177631 |
| Jun. 17, 2005 | (JP) | ............................ 2005-177763 |

(51) Int. Cl.
*D02G 3/02* (2006.01)
*D02G 3/22* (2006.01)
(52) U.S. Cl. ..................................................... 57/212
(58) Field of Classification Search ................ 57/212, 57/223, 232
See application file for complete search history.

(56) References Cited

U.S. PATENT DOCUMENTS

| 6,119,747 A * | 9/2000 | Yamanaka ................... 152/527 |
| 6,322,907 B1 | 11/2001 | Hauser et al. |
| 6,365,273 B1 * | 4/2002 | Baillievier ................... 428/379 |
| 2004/0108038 A1 | 6/2004 | Cordonnier et al. |
| 2005/0037197 A1 * | 2/2005 | Vanneste et al. ............ 428/375 |

FOREIGN PATENT DOCUMENTS

| EP | 0 976 541 A1 | 2/2000 |
| EP | 1 552 917 A1 | 7/2005 |
| GB | 1466114 A * | 3/1977 |

(Continued)

*Primary Examiner*—Shaun R Hurley
(74) *Attorney, Agent, or Firm*—McDermott Will & Emery LLP

(57) ABSTRACT

The disclosed bead cord which is lightweight and inexpensive and high in formability includes an annular core and a wrap wire helically wrapped around the annular core, the annular core being made of a medium carbon steel or an alloy steel having a lower carbon content and containing specific elements in suitable amounts. The diameter $d_C$ of alular core satisfies $1.04 \leq d_C/d_S \leq 1.30$ where $d_S$ is the diameter of the wrap wire. The wrap wire has a coil diameter $D_S$ which is 0.5 to 1.3 times diameter $D_C$ of an annular shape of the annular core. The annular core may be formed with a plating layer of an Al—Zn alloy or a thick plating layer of Zn, or the annular core may be made of stainless steel.

14 Claims, 3 Drawing Sheets

FOREIGN PATENT DOCUMENTS

| | | |
|---|---|---|
| JP | 49-102002 | 9/1974 |
| JP | 50-131201 | 10/1975 |
| JP | 62-6398 | 1/1987 |
| JP | 1-273707 | 11/1989 |
| JP | 4-266506 | 9/1992 |
| JP | 5-163686 | 6/1993 |
| JP | 7-68662 | 3/1995 |
| JP | 8-188851 | 7/1996 |
| JP | 11-321247 | 11/1999 |
| JP | 2001-164337 | 6/2001 |
| JP | 2001-301430 | 10/2001 |
| JP | 2003-129178 | 5/2003 |
| JP | 3499261 | 5/2003 |
| WO | WO 01/49926 A1 | 7/2001 |

\* cited by examiner

*Prior Art*

ANNULAR CONCENTRIC-LAY BEAD CORD

RELATED APPLICATIONS

This application is the U.S. National Phase under 35 U.S.C §371 of International Application No. PCT/JP2005/012227, filed on Jul. 1, 2005, which in turn claims the benefit of JP 2004-198329, filed on Jul. 5, 2004; JP 2004-224303 filed on Jul. 30, 2004; and JP 2005-177631 filed on Jun. 17, 2005; JP 2005-177763 filed on Jun. 17, 2005 the disclosures of which Applications are incorporated by reference herein.

TECHNICAL FIELD

The present invention relates to a bead cord to be embedded in a bead of a pneumatic tire to reinforce the bead, and particularly an annular concentric-lay bead cord comprising an annular core and a sheath layer or layers formed by helically wrapping a wrap wire around the annular core.

BACKGROUND ART

Annular concentric-lay bead cords are widely used as reinforcements for beads of various vehicle tires. As shown in FIG. 3, many of such cords are formed by helically wrapping a wrap wire 2 in a single layer or a plurality of layers around an annular core 1 formed by abutting and welding together both ends of a steel wire (as disclosed in Patent document 1). The wrap wire 2 has a smaller diameter than the annular core 1.

The steel wire forming the annular core is typically a mild steel wire containing carbon by 0.06 to 0.15 percent by weight. In order to ensure strength and rigidity sufficient to obtain formability necessary when wrapping a wrap wire, the annular core has a diameter not less than 1.5 times the diameter of the wrap wire. But in order to improve fuel economy of vehicles, a bead cord is acutely desired having a small-diameter annular core and thus lightweight, thereby reducing the weight of the tire in which the bead cord is embedded.

The wrap wire is a hard steel wire plated with brass or bronze to improve adhesion strength with the rubber of a tire. Plating is typically electroplating or displacement plating. The thickness of the plating is typically about 0.2 to 0.3 micrometers. The reason why the plating is this thin is because the thinner the plating, the higher the adhesion strength between the wire and the rubber. On the other hand, the annular core is often used in a bare state, so that it tends to corrode if the rubber becomes moistened. With the increasing requirements for higher standards of safety and high performance of tires, higher corrosion resistance is now required for the annular core too.

In order to answer these requirements, Patent publication 2 discloses a bead cord comprising an annular core and a wrap wire that is equal in diameter to the annular core and made of hard steel. In order to increase the adhesion strength between the core and the rubber, the core is also plated as with the wrap wire. The adjacent turns of the wrap wire are spaced more widely from each other than those of conventional bead wires so that rubber reaches the annular core and are adhered thereto.

Since the annular core of the bead cord disclosed in each of the examples of Patent document 2 is a hard steel wire (carbon content: 0.72 to 0.82%), even though its diameter is as small as the diameter of the wrap wire, the annular core is as high in strength and rigidity as conventional annular cores. The bead cord is thus extremely lightweight compared to conventional ones. Further, even if the rubber becomes moistened, the annular core is less likely to corrode by contact with the rubber.

However, when a hard steel wire containing not less than 0.57% of carbon is welded, a hard and brittle, martensitic structure tends to develop in its welded portions, so that such a hard steel wire tends to break at the welded portions if used with no post treatment. Thus, it is necessary to anneal such a bead cord after abutting and welding both ends of a hard steel wire into the annular core. This pushes up the cost. Also, a long time is needed to remove burrs after welding, which also pushes up the cost.

Further, because the annular core has a diameter equal to the diameter of the wrap wire, although the annular core is equivalent in strength and rigidity to conventional large-diameter annular cores, it is more difficult to wrap the wrap wire uniformly and evenly around such a small-diameter annular core. Moreover, while the wrap wire is being wrapped around such a small-diameter annular core, the annular core may be pulled radially outwardly by the wrap wire to such an extent that the annular core is partially located radially outside of the wrap wire. This deforms the cord (such that when the cord is placed on a flat surface, it partially separates from the flat surface).

Moreover, it is practically difficult to wrap the wrap wire around the annular core such that the adjacent turns of the wrap wire are uniformly separated from each other. Thus, rubber cannot uniformly cover the annular core. At portions where the annular core is not covered by the rubber, the steel wire forming the annular core tends to quickly grow rust because the thin plating formed on the annular core to improve adhesion strength with the rubber does not provide the annular core with sufficient corrosion resistance. Such rust on the annular core will eventually infiltrate into the rubber. In the case of a vehicle tire, if fretting occurs between the annular core and the wrap wire, their plating layers tend to be worn off in a short period of time, which reduces the corrosion resistance, thus increasing the corroded area. By repeating plating treatment, it is possible to increase the final thickness of the plating to a certain extent. But because electroplating and electroless plating are inherently not adapted for forming a thick plating layer, work efficiency is inferior, which increases the cost.

Patent document 3 discloses a bead cord including an annular core made of a high-performance synthetic resin to reduce the weight of the cord. Since the annular core is made of a resin, the core shows improved corrosion resistance. But since a high-performance material is used, such a cord is expensive. Storage and handling are also difficult. Annular cores made of nylon 6 or polyethylene naphthalate (PEN), as used in examples of Patent document 3, will be insufficient in rigidity as bead cords if their diameter is equal to the diameter of conventional annular cores. Thus, such cords are not practically usable.

Patent document 1: JP patent publication 3499261
Patent document 2: JP patent publication 05-163686
Patent document 3: JP patent publication 11-321247

DISCLOSURE OF THE INVENTION

Objects of the Invention

An object of the present invention is to provide a bead cord which is lightweight and inexpensive, high in formability, and includes an annular core that is high in corrosion resistance.

Means to Solve the problems

A bead cord according to the present invention which is lightweight, inexpensive and high in formability comprises an annular core and a wrap wire helically wrapped around the annular core, the annular core being made of a medium carbon steel and having a diameter $d_C$ that satisfies the following relation with respect to the diameter $d_S$ of the wrap wire:

$$1.04 \leq d_C/d_S \leq 1.30$$

the wrap wire having a coil diameter which is 0.5 to 1.3 times the coil diameter of the annular core.

Such an annular core, which is made of medium carbon steel and has a diameter slightly larger than the wrap wire, is equivalent in strength and rigidity to a conventional large-diameter annular core made of mild steel. Still, the bead cord is sufficiently lightweight. Further, the welded portions of the annular core is less likely to turn to martensitic structure, or even if it turns to martensitic structure, it is less brittle, so that no annealing is necessary. Burrs can be removed easily too. The bead cord according to the present invention can therefore be manufactured at substantially the same cost as conventional cords.

The upper limit of the ratio of the diameter of the annular core to the diameter of the wrap wire was determined such that the bead cord according to the present invention will be substantially lighter (by not less than 10%) in weight than conventional bead cords. Its lower limit was determined such that the annular core will not be pushed radially outwardly by the wrap wire while the wrap wire is being wrapped around the annular core.

Since the coil diameter of the wrap wire is 0.5 to 1.3 times the coil diameter of the annular core, even though the annular core has a relatively small diameter compared with the wrap wire, the wrap wire can be easily and uniformly wrapped around the annular core.

The annular core is preferably made of carbon steel containing carbon by 0.28 to 0.56 percent by weight. If the carbon content is less than 0.28 percent by weight, the annular core, which has a relatively small diameter as mentioned above, tends to be insufficient in strength and rigidity. If the carbon content is over 0.56 percent by weight, the welded portion may turn to martensitic structure, making annealing indispensable.

Instead of such medium carbon steel, the annular core may be made of an alloy steel of which the carbon content is at the level of mild steel, and of which the Si and Mn contents are greater than those of ordinary carbon steel with a suitable amount of Cr added so that the annular core has strength and rigidity equivalent to those of hard steel wires, and is still superior in weldability. Specifically, such an alloy steel comprises 0.08 to 0.27 percent by weight of C, 0.30 to 2.00 percent by weight of Si, 0.50 to 2.00 percent by weight of Mn, and 0.20 to 2.00 percent by weight of Cr, the balance being Fe and impurities that may inevitably mix into the alloy. If the content of any of Si, Mn and Cr is less than their respective lower limit, the steel alloy will be insufficient in strength. If the Si content exceeds its upper limit, the alloy tends to be damaged during hot rolling. If the Mn content exceeds its upper limit, workability will deteriorate. The Cr content was determined in the above range in view of hardenability and cost.

In order to further suppress lowering of ductility at welded portion, the alloy steel may further contain at least one of 0.001 to 0.10 percent by weight of Al, 0.001 to 0.10 percent by weight of Ti, 0.001 to 0.10 percent by weight of Nb, 0.001 to 0.10 percent by weight of V, 0.0003 to 0.10 percent by weight of B, and 0.001 to 0.10 percent by weight of Mg. If the contents of these elements are less than their respective lower limits, they will scarcely serve to improve the ductility of the alloy. If their contents exceed their respective upper limits, their nitrides and sulfides will deteriorate the ductility of the alloy.

Preferably, to ensure the formability of the cord, the ratio of the coil diameter $D_S$ of the wrap wire to the coil diameter $D_C$ of the annular core is 0.56 to 1.26.

As a first means for improving the corrosion resistance of the bead cord without increasing its cost, the annular core was plated with an Al—Zn alloy.

By plating the annular core with an Al—Zn alloy, which is corrosion-resistant and can form a thick plating layer, the annular core is less likely to be exposed even if fretting occurs between the annular core and the wrap wire. Thus, the Al—Zn alloy plating allows the annular core to stably maintain corrosion resistance for a long period of time at a low cost.

Such an Al—Zn alloy plating layer preferably contains 3.5 to 15 percent of Al. While the higher the Al content, the higher the corrosion resistance, the upper limit of the Al content was determined at 15 percent in view of workability and the fact that Al is expensive. If the Al content is less than 3.5 percent, such a plating layer will be substantially no different in corrosion resistance from less expensive Zn plating.

In order to prevent fretting between the annular core and the wrap wire, the Al—Zn alloy plating layer should be as thick as possible. But if it is too thick, the sectional area of the steel wire forming the annular core has to be correspondingly reduced. This makes it difficult to ensure the necessary strength of the bead cord. The upper limit of the thickness of the Al—Zn alloy plating layer was therefore determined at 35 micrometers. Its lower limit is preferably determined at 1 micrometer so as to ensure the corrosion resistance.

According to the present invention, as a second means for improving the corrosion resistance of the annular core, the annular core is plated with Zn. While Zn plating is inferior in corrosion resistance to Al—Zn plating, thick Zn plating can be formed at a lower cost.

The upper limit of the thickness of such a Zn plating layer is determined at the same level as that of the Al—Zn alloy plating layer, i.e. 35 micrometers. But its lower limit is preferably twice the lower limit of the Al—Zn alloy plating layer, i.e. 2 micrometers.

If the annular core is plated with a molten metal, the annular core has to be passed through a plating bath of 450 to 500 degrees Celsius, The annular core is therefore preferably made of a material having, besides weldability, sufficient heat resistance so as to keep high tensile strength when heated.

According to the present invention, as a material suitable for an annular core to be plated with a molten metal, an alloy is selected which comprises 0.08 to 0.27 percent by weight of C, 0.30 to 2.00 percent by weight of Si, 0.50 to 2.00 percent by weight of Mn, and 0.20 to 2.00 percent by weight of Cr, and further contains at least one of 0.01 to 1.00 percent by weight of Mo, 0.10 to 2.00 percent by weight of Ni, 0.10 to 2.00 percent by weight of Co, and 0.01 to 1.00 percent by weight of W, and 0.001 to 0.10 percent by weight of at least one of Al, Nb, Ti and V, the balance being Fe and impurities that may inevitably mix into the alloy.

Since the C content of such an alloy steel is low, i.e. at the level of mild steel, weldability is high. By adding a suitable amount of Cr, the strength and heat resistance improve. By adding a suitable amount of at least one of Mo, Ni, Co and W, the alloy steel can keep high tensile strength when heated. Further, a suitable amount of at least one of Al, Nb, Ti and V is added to prevent deterioration in ductility at the welded portions. If any of the Si, Mn and Cr contents is lower than the respective lower limit, the strength of the alloy steel will be insufficient. If the Si content is higher than its upper limit, the alloy steel tends to be damaged. If the Mn content is higher than its upper limit, workability will deteriorate. The Cr content was determined taking into consideration the hardenability and cost. If the Mo, Ni, Co and W contents are less than their respective lower limits, they will not serve to increase the strength of the alloy steel. If higher than their respective upper limits, they will deteriorate ductility. If the Al, Nb, Ti and V contents are lower than their respective lower limits, they will not serve to improve ductility. If higher than their respective upper limits, their nitrides and sulfides tend to markedly deteriorate ductility.

The steel wire formed of such an alloy steel is therefore superior in weldability and heat resistance, and keeps sufficient ductility after its ends are welded together. Its tensile strength scarcely declines when it is passed through a plating bath to form a thick plating layer.

Instead of such an alloy steel, another alloy steel may be used which comprises 0.08 to 0.27 percent by weight of C, 0.30 to 2.00 percent by weight of Si, 0.50 to 2.00 percent by weight of Mn, and 0.20 to 2.00 percent by weight of Cr, the balance being Fe and impurities that may inevitably mix into the alloy steel. Since the C content of this alloy steel is also at the level of mild steel, and it contains Si, Mn and Cr, this alloy steel also has high ductility after welding and strength after plating, which are required for an annular core.

According to the present invention, as a third means for improving the corrosion resistance of the annular core, the annular core is made of stainless steel. Stainless steel is high in tensile strength, shows excellent corrosion resistance and heat resistance. This is because stainless steel contains large amounts of Ni and Cr, which are elements that effectively serve to improve the corrosion resistance and heat resistance. Thus, stainless steel has the functions of both of the above-mentioned thick plating and alloy steel. Preferable stainless steels include SUS304 and SUS316, which are both usable for general purposes.

ADVANTAGES OF THE INVENTION

The bead cord according to the present invention is lightweight and less expensive, shows high formability, and includes an annular core that is highly corrosion-resistant.

BRIEF DESCRIPTION OF THE DRAWINGS

[FIG. 2] (a) is an external view of the bead cord of the embodiment, (b) is an enlarged perspective view of a; and (c) is an enlarged sectional view of a

DESCRIPTION OF REFERENCES

1. Annular core
2. Wrap wire
3. Wrap wire supply reel
4. Plating layer

BEST MODE FOR EMBODYING THE INVENTION

Figure 1:
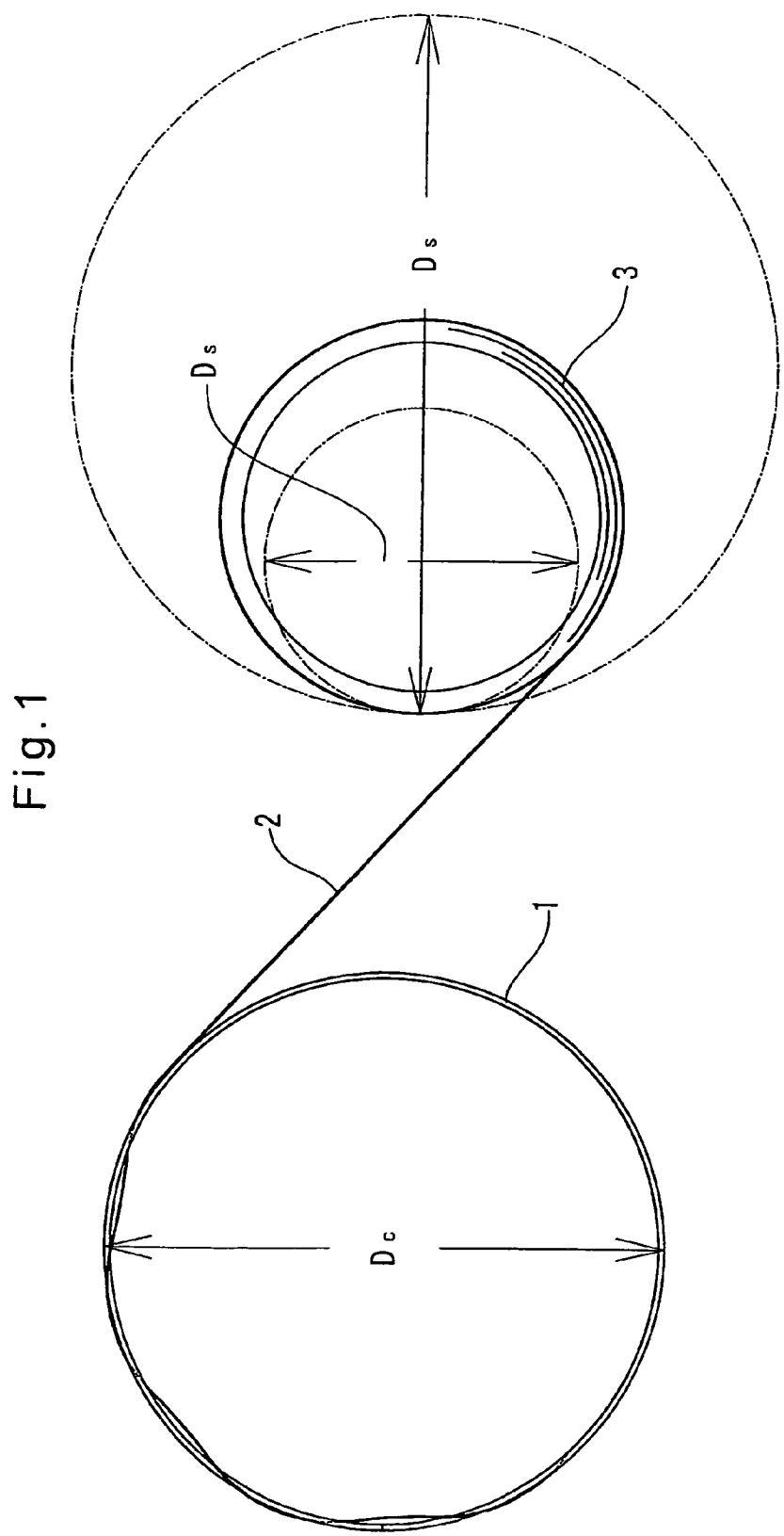
[FIG. 1] a schematic view showing the relationship between the coil diameter $D_C$ of the annular core and the coil diameter $D_S$ of the wrap wire when forming a bead cord of an embodiment
Figure 2:
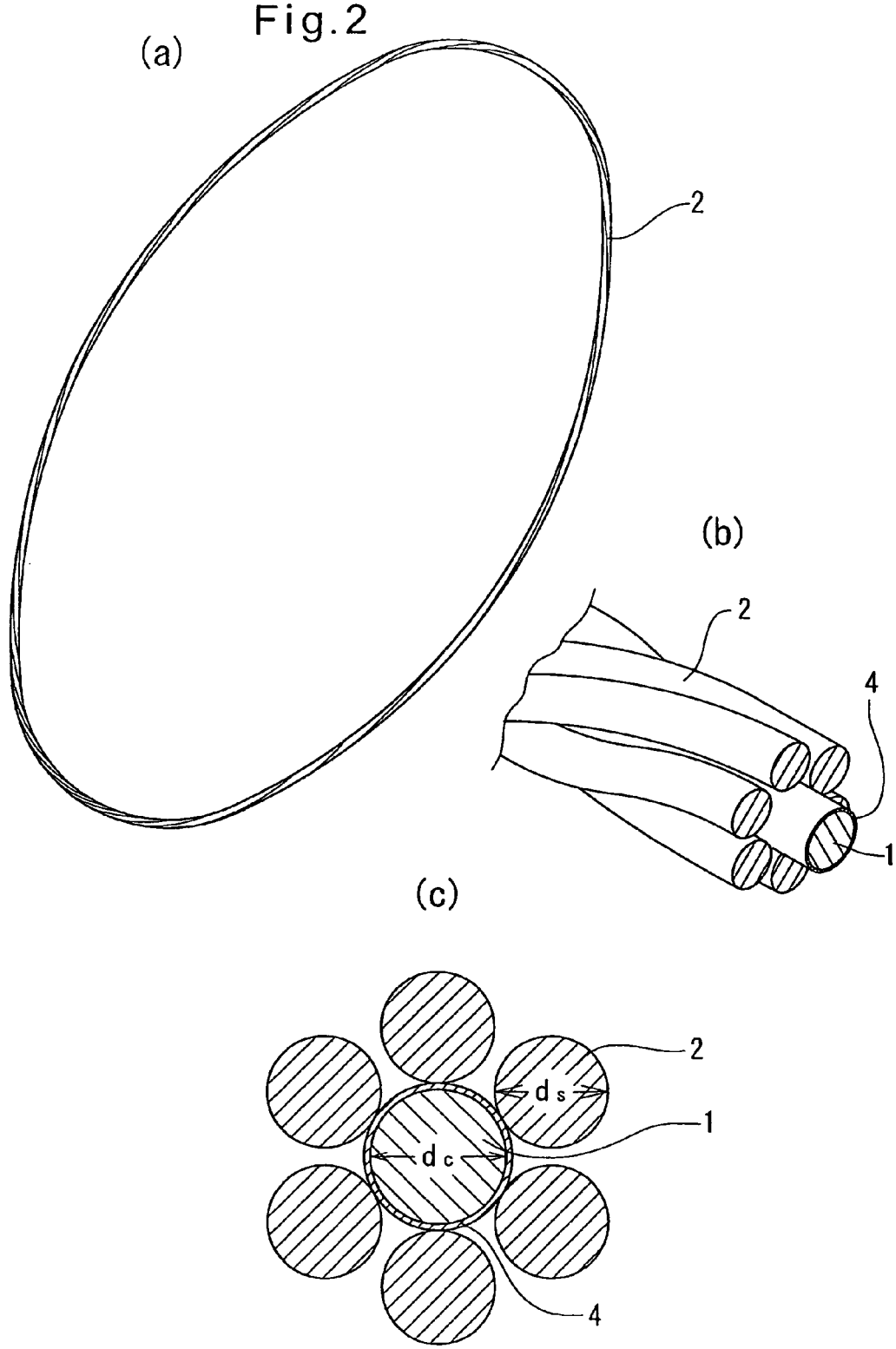
Figure 3:
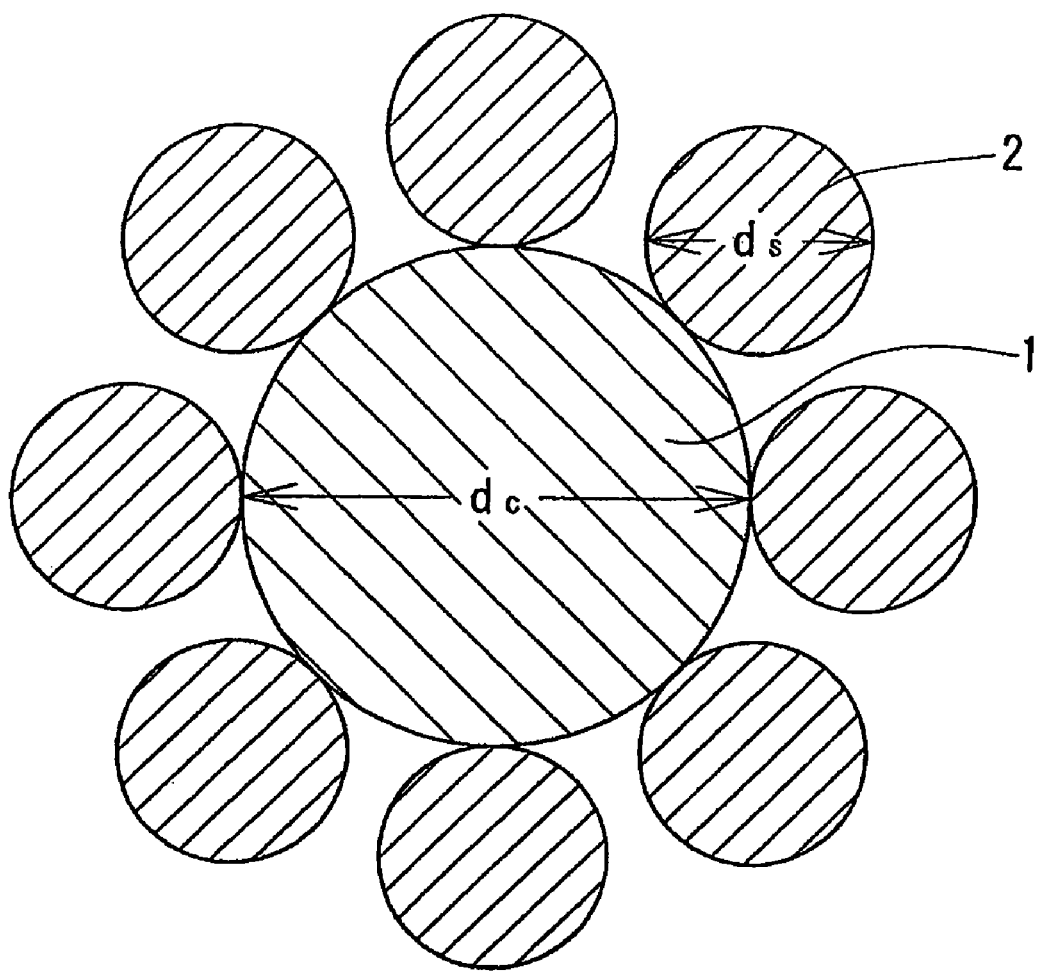
[FIG. 3] a sectional view of a conventional bead cord

The embodiment of the present invention is now described with reference to the drawings. As shown in FIG. 1 and FIGS. 2(a) to 2(c), the annular concentric-lay bead cord of the embodiment comprises an annular core 1 having a coil diameter $D_C$, and wrap wire 2 having a coil diameter $D_S$, which is supplied from a wrap wire supply reel 3 and helically wrapped around the annular core 1. In the embodiment, as shown in FIGS. 2(b) and 2(c), the wrap wire 2, which has a diameter $d_S$, is wrapped around the annular core, which has a diameter $d_C$, to form a single sheath layer by making six rounds along the annular core. But the wrap wire may be wrapped around the annular core so as to form a plurality of sheath layers.

The annular core is formed by welding together the ends of a steel wire having a slightly greater diameter than the wrap wire 2 (ratio $(d_C/d_S)$=1.04 to 1.30) and made of medium carbon steel containing 0.28 to 0.56 percent by weight of C. The annular core 2 is equivalent in strength and rigidity to conventional larger-diameter mild carbon steel wires. Since the annular core is smaller in diameter than conventional annular cores, it is lightweight. Moreover, its welded portions are less likely to develop martensitic structure, or even if they turn into martensitic structure, they are less brittle. Thus, no annealing is necessary, and burrs can be removed easily. While the wrap wire 2 is being wrapped around the annular core 1, the annular core is less likely to be pushed radially outwardly by the wrap wire 2.

The annular core 1 has a thick plating layer 4 of an Al—Zn alloy on its surface, so that it stably maintains corrosion resistance for a long period of time.

The wrap wire 2 is made of high carbon steel. Before wrapping the wrap wire 2 around the annular core, its leading end is temporarily secured to the annular core 1 by means of an unvulcanized rubber sheet which is made of the same material as the tire. When the wrap wire has been wrapped around the annular core, its trailing end is coupled to its leading end by means of a brass sleeve.

The coil diameter $D_S$ of the wrap wire 2 is 0.50 to 1.3 times the coil diameter $D_C$ of the annular core 1. Thus, although the annular core 1 is small in diameter, the wrap wire 2 can be smoothly and uniformly wrapped around the annular core 1.

An evaluation test was conducted to see how lightweight the bead cord according to the present invention is. In particular, annular core specimens shown in Table 1 were prepared. Bead cords were prepared by wrapping a wrap wire around each of the respective annular core specimens so that the number of rounds of the wrap wire corresponds to the diameter of the annular core. For each cord, the weight reduction rate, resistance to breakage of the cord at its welded portions, and its formability were determined. The test results are shown in Table 2.

TABLE 1

| Specimen | Material | Chemical composition (wt %) | | | | | | | | Tensile strength (N/mm$^2$) |
|---|---|---|---|---|---|---|---|---|---|---|
| | | C | Si | Mn | Cr | P | S | Ti | Al | |
| A | Mild steel | 0.08 | 0.18 | 0.43 | — | 0.014 | 0.005 | — | — | 930 |
| B | Hard steel | 0.81 | 0.19 | 0.51 | — | 0.016 | 0.004 | — | — | 2,090 |
| C | Medium carbon steel | 0.32 | 0.21 | 0.46 | — | 0.012 | 0.005 | — | — | 1,380 |
| D | Medium carbon steel | 0.55 | 0.22 | 0.46 | — | 0.014 | 0.006 | — | — | 1,610 |
| E | Alloy steel | 0.17 | 0.92 | 1.53 | 0.41 | 0.013 | 0.005 | — | — | 1,680 |
| F | Alloy steel | 0.17 | 0.93 | 1.50 | 0.41 | 0.013 | 0.006 | 0.08 | 0.03 | 1,670 |

TABLE 2

| Cord No. | Specimen | Cord dia. (mm) | Wrap wire | | | Cord sectional area (mm$^2$) | Coil dia. of the core (mm) | Coil dia. ratio ($D_s/D_c$) | Weight reduction rate (%) | Resistance to breakage at welded portions of the core | Formability of the core |
|---|---|---|---|---|---|---|---|---|---|---|---|
| | | | Dia. (mm) | Number of wires as seen in cord section | Wire dia. ratio ($d_c/d_s$) | | | | | | |
| 1 | A | 2.2 | 1.4 | 8 | 1.57 | 16.12 | 366.0 | 2.01 | — | ○ | Δ |
| 2 | A | 2.2 | 1.4 | 8 | 1.57 | 16.12 | 366.0 | 1.31 | — | ○ | ○ |
| 3 | A | 2.2 | 1.4 | 8 | 1.57 | 16.12 | 366.0 | 0.96 | — | ○ | ○ |
| 4 | B | 1.4 | 1.4 | 6 | 1.00 | 10.78 | 365.2 | 2.01 | 33 | X | X |
| 5 | B | 1.4 | 1.4 | 6 | 1.00 | 10.78 | 365.2 | 1.31 | 33 | X | X |
| 6 | B | 1.4 | 1.4 | 6 | 1.00 | 10.78 | 365.2 | 0.96 | 33 | X | X |
| 7 | C | 1.8 | 1.4 | 7 | 1.29 | 13.32 | 365.6 | 1.98 | 17 | ○ | Δ |
| 8 | C | 1.8 | 1.4 | 7 | 1.29 | 13.32 | 365.6 | 1.31 | 17 | ○ | Δ |
| 9 | C | 1.8 | 1.4 | 7 | 1.29 | 13.32 | 365.6 | 0.93 | 17 | ○ | ○ |
| 10 | C | 1.8 | 1.4 | 7 | 1.29 | 13.32 | 365.6 | 0.63 | 17 | ○ | ○ |
| 11 | C | 1.8 | 1.4 | 7 | 1.29 | 13.32 | 365.6 | 0.56 | 17 | ○ | ○ |
| 12 | C | 1.8 | 1.4 | 7 | 1.29 | 13.32 | 365.6 | 0.49 | 17 | ○ | Δ |
| 13 | D | 1.5 | 1.4 | 6 | 1.07 | 11.00 | 365.3 | 1.37 | 32 | ○ | Δ |
| 14 | D | 1.5 | 1.4 | 6 | 1.07 | 11.00 | 365.3 | 1.34 | 32 | ○ | Δ |
| 15 | D | 1.5 | 1.4 | 6 | 1.07 | 11.00 | 365.3 | 0.89 | 32 | ○ | ○ |
| 16 | D | 1.5 | 1.4 | 6 | 1.07 | 11.00 | 365.3 | 0.60 | 32 | ○ | ○ |
| 17 | D | 1.5 | 1.4 | 6 | 1.07 | 11.00 | 365.3 | 0.52 | 32 | ○ | Δ |
| 18 | E | 1.5 | 1.4 | 6 | 1.07 | 11.00 | 365.3 | 0.53 | 32 | ○ | Δ |
| 19 | E | 1.5 | 1.4 | 6 | 1.07 | 11.00 | 365.3 | 0.99 | 32 | ○ | ○ |
| 20 | E | 1.5 | 1.4 | 6 | 1.07 | 11.00 | 365.3 | 1.26 | 32 | ○ | ○ |
| 21 | F | 1.5 | 1.4 | 6 | 1.07 | 11.00 | 365.3 | 0.49 | 32 | ○ | Δ |
| 22 | F | 1.5 | 1.4 | 6 | 1.07 | 11.00 | 366.3 | 0.85 | 32 | ○ | ○ |

The properties in Table 2 were determined as follows.

(1) Weight Reduction Rate

The weight reduction rate is the sectional area reduction rate of each cord based on the sectional area of a conventional cord comprising an annular core having a diameter of 2.2 mm and made of mild steel, and a wrap wire having a diameter of 1.4 mm and wrapped around the core so as to make eight rounds.

Weight reduction rate (%)=(1−sectional area of each cord/sectional area of the conventional cord)×100

(2) Resistance to Breakage of the Core at its Welded Portions 20 steel wires were prepared for each of the cord Nos. 1 to 22 in Table 2. The ends of each of the steel wires were welded together at an ambient temperature of 30 degrees Celsius, the thus welded steel wires were left for a week, and bending loads were applied to the welded portions of each steel wire. The meanings of the symbols ○ and X are as follows:

○: Not less than 18 of the 20 steel wires remained unbroken.

X: Less than 18 of the 20 steel wires remained unbroken.

(3) Formability of the Cords

Determinations were made on the shape of each cord formed and how uniformly the wrap wire was wrapped around the core as follows. When the above two determinations were at different ranks from each other, the lower of the two ranks is shown in Table 2.

1. Shape of the Cord 20 cords were prepared for each of the cord Nos. 1 to 22 in Table 2, the cords were placed on a flat surface of e.g. a platen, and the maximum gap present between the flat surface and each cord was measured with a scale. The meanings of the symbols in Table 2 are as follows:

○: Not less than 11 of the 20 cords developed a maximum gap equal to or smaller than 0.5 mm, and the maximum gap of any cord which exceeded 0.5 mm was not more than 1.0 mm.

Δ: Less than 11 of the 20 cords developed a maximum gap equal to or smaller than 0.5 mm, and the maximum gap of any cord which exceeded 0.5 mm was not more than 1.5 mm.

X: Less than 11 cords developed a maximum gap equal to or smaller than 1.5 mm.

2. How Uniformly the Wrap Wire was Wrapped Around the Core

How uniformly the wrapping wire was wrapped around the annular core was visually checked. The meanings of the symbols in Table 2 are as follows:

◯: The number of cords of which the wrap wire was arranged with sufficient uniformity was not less than 18.

Δ: The number of cords of which the wrap wire was arranged with sufficient uniformity was not less than 10 and less than 18.

X: The number of cords of which the wrap wire was arranged with sufficient uniformity was less than 10.

As is apparent from Table 2, cords including an annular wire made of medium carbon steel or an alloy steel which is superior in solderability, and having such a small diameter as to be only slightly larger than the wrap wire, wherein the wrap wire has a coil diameter that is 0.5 to 1.3 times (preferably 0.56 to 1.26 times) the coil diameter of the annular core, are significantly lightweight compared with conventional cords. After welding the core, no annealing is necessary. Formability is good too. In particular, the cords which satisfy all of the requirements of the present invention (i.e. cord Nos. 9, 10, 11, 15, 16, 19, 20 and 22) scored high marks in all of the three evaluation categories. Thus, by using these cords as bead cords in vehicle tires, it is possible to obtain inexpensive, lightweight, high-performance tires.

An evaluation test was conducted to verify how annular cores that meet all of the requirements according to the present invention show improved corrosion resistance. In particular, different kinds of annular core specimens defined in Table 3 were prepared, and the cores alone were passed through a plating bath to determine how their tensile strength had fallen and their resistance to breakage at their welded portions. The test conditions and test results are shown in Table 4.

TABLE 3

| | | Chemical composition (wt %) | | | | | | | | | |
|---|---|---|---|---|---|---|---|---|---|---|---|
| Specimen | Material | C | Si | Mn | P | S | Ni | Cr | Other 1 | Other 2 | Other 3 |
| G | Mild steel | 0.08 | 0.18 | 0.43 | 0.014 | 0.005 | — | — | — | — | — |
| H | Hard steel | 0.82 | 0.19 | 0.51 | 0.016 | 0.004 | — | — | — | — | — |
| I | Medium carbon steel | 0.51 | 0.22 | 0.46 | 0.014 | 0.006 | — | — | — | — | — |
| J | Alloy steel | 0.17 | 0.92 | 1.53 | 0.013 | 0.005 | — | 0.41 | — | — | — |
| K | Alloy steel | 0.17 | 0.93 | 1.50 | 0.013 | 0.006 | — | 0.41 | Ti: 0.09 | Al: 0.04 | — |
| L | Alloy steel | 0.18 | 0.90 | 1.54 | 0.014 | 0.008 | — | 0.38 | Mo: 0.14 | Ti: 0.10 | Al: 0.04 |
| M | SUS304 | 0.08 | 0.43 | 1.18 | 0.027 | 0.005 | 8.45 | 18.38 | — | — | — |
| N | SUS316 | 0.04 | 0.60 | 1.34 | 0.026 | 0.002 | 11.6 | 17.42 | Mo: 2.05 | — | — |

TABLE 4

| | | | | | | | | Evaluated items | | | |
|---|---|---|---|---|---|---|---|---|---|---|---|
| | | Tensile strength of core | | Al—Zn or Zn plating | | Reduction rate of | Corrosion resistance (salt water spray test) | | | Resistance to breakage |
| | | Core | (N/mm²) | Al | Thickness | tensile | After | After | After | of welded |
| Core No. | Specimen used | dia. (mm) | Bare wire | After plating | content (%) | of plating (μm) | strength (%) | leaving 120 h | leaving 480 h | leaving 1000 h | portions of the core |
| 1 | G | 2.2 | 931 | — | Bare wire | — | — | X | X | X | ⊚ |
| 2 | G | 2.2 | 931 | 871 | 0 | 1.4 | 6.4 | Δ | X | X | ⊚ |
| 3 | H | 1.4 | 2,110 | — | Conventional brass plating | 0.2 | — | X | X | X | X |
| 4 | H | 1.4 | 2,110 | 1,916 | 5.0 | 1.6 | 9.2 | ⊚ | ◯ | Δ | X |
| 5 | I | 1.5 | 1,564 | 1,445 | 3.2 | 0.8 | 7.6 | Δ | X | X | ◯ |
| 6 | I | 1.5 | 1,564 | 1,452 | 4.2 | 0.7 | 7.2 | ◯ | Δ | X | ◯ |
| 7 | I | 1.5 | 1,564 | 1,440 | 4.5 | 1.3 | 7.9 | ⊚ | Δ | X | ◯ |
| 8 | I | 1.5 | 1,564 | 1,433 | 10.5 | 12.7 | 8.4 | ⊚ | ⊚ | ⊚ | ◯ |
| 9 | I | 1.5 | 1,564 | 1,446 | 0 | 1.6 | 7.5 | Δ | X | X | ◯ |
| 10 | I | 1.5 | 1,564 | 1,444 | 0 | 2.4 | 7.7 | ◯ | Δ | X | ◯ |
| 11 | I | 1.5 | 1,564 | 1,438 | 0 | 8.6 | 8.1 | ⊚ | ◯ | Δ | ◯ |
| 12 | J | 1.5 | 1,680 | 1,621 | 4.1 | 0.7 | 3.5 | Δ | Δ | X | ⊚ |
| 13 | J | 1.5 | 1,680 | 1,624 | 4.6 | 1.6 | 3.3 | ⊚ | ◯ | Δ | ⊚ |
| 14 | J | 1.5 | 1,680 | 1,620 | 10.1 | 13.5 | 3.6 | ⊚ | ⊚ | ⊚ | ⊚ |
| 15 | K | 1.5 | 1,682 | 1,632 | 3.1 | 0.8 | 3.0 | Δ | X | X | ⊚ |
| 16 | K | 1.5 | 1,682 | 1,629 | 3.9 | 0.8 | 3.2 | Δ | Δ | X | ⊚ |
| 17 | K | 1.5 | 1,682 | 1,626 | 4.7 | 1.4 | 3.3 | ⊚ | ◯ | Δ | ⊚ |
| 18 | K | 1.5 | 1,682 | 1,623 | 10.5 | 12.3 | 3.5 | ⊚ | ⊚ | ⊚ | ⊚ |
| 19 | K | 1.5 | 1,682 | 1,629 | 0 | 1.7 | 3.2 | Δ | X | X | ⊚ |
| 20 | K | 1.5 | 1,682 | 1,627 | 0 | 2.5 | 3.3 | ◯ | Δ | X | ⊚ |
| 21 | K | 1.5 | 1,682 | 1,624 | 0 | 8.8 | 3.4 | ⊚ | ◯ | Δ | ⊚ |
| 22 | K | 1.5 | 1,682 | 1,625 | 0 | 14.8 | 3.4 | ⊚ | ◯ | Δ | ⊚ |

TABLE 4-continued

| | | | Tensile strength of core (N/mm²) | | Al—Zn or Zn plating | | Evaluated items | | | | |
|---|---|---|---|---|---|---|---|---|---|---|---|
| | | | | | | | Reduction rate of | Corrosion resistance (salt water spray test) | | | Resistance to breakage |
| Core No. | Specimen used | Core dia. (mm) | Bare wire | After plating | Al content (%) | Thickness of plating (μm) | tensile strength (%) | After leaving 120 h | After leaving 480 h | After leaving 1000 h | of welded portions of the core |
| 23 | L | 1.5 | 1,694 | 1,652 | 3.1 | 0.8 | 2.5 | Δ | X | X | ◉ |
| 24 | L | 1.5 | 1,694 | 1,649 | 4.0 | 0.7 | 2.7 | Δ | Δ | X | ◉ |
| 25 | L | 1.5 | 1,694 | 1,643 | 6.3 | 9.5 | 3.0 | ◉ | ◉ | ○ | ◉ |
| 26 | L | 1.5 | 1,694 | 1,640 | 10.4 | 12.9 | 3.2 | ◉ | ◉ | ◉ | ◉ |
| 27 | L | 1.5 | 1,694 | 1,648 | 0 | 1.7 | 2.7 | Δ | X | X | ◉ |
| 28 | L | 1.5 | 1,694 | 1,649 | 0 | 2.5 | 2.7 | ○ | Δ | X | ◉ |
| 29 | L | 1.5 | 1,694 | 1,645 | 0 | 8.8 | 2.9 | ○ | ○ | Δ | ◉ |
| 30 | L | 1.5 | 1,694 | 1,643 | 0 | 15.2 | 3.0 | ◉ | ○ | Δ | ◉ |
| 31 | M | 1.5 | 1,823 | 1,821 | — | — | X0 | ◉ | ○ | ○ | ◉ |
| 32 | N | 1.5 | 1,551 | 1,554 | — | — | X0 | ◉ | ◉ | ○ | ◉ |

The properties in Table 4 were determined as follows.

(1) Tensile Strength

Bare wire: Strength of each bare wire formed by an ordinary dry wire drawing machine to an ordinary degree of drawing After welding: Each bare wire was passed through a molten plating bath to plate the wire with an Al—Zn alloy or Zn. The thus plated wire was measured for its breaking load, and its tensile strength was calculated from the breaking load and the wire diameter before plating.

While stainless steel wires need not be plated, in order to calculate determine how the tensile strength will fall after plating, they were passed through a plating bath and their tensile strength after plating was measured in the above manner.

(2) Thickness of Plating

Since annular cores according to the present invention are formed with a relatively thick and large amount of plating layer, the amount of plating was measured by inductively coupled plasma-atomic emission spectroscopy (ICP-AES), and using the following simplified equation, the thickness of plating was calculated from the thus calculated amount of plating layer, the diameter of the wire and the specific gravity of the metal forming the plating layer:

$$C = 2 \times W \times d/\rho$$

where

C: Thickness of plating (μm)
W: Amount of plating (g/kg)
d: diameter of the bare wire (mm)
ρ: specific gravity of the metal forming the plating layer (If the plating layer is formed of a metal, the specific gravity is calculated based on the contents of the respective metals.)

(3) Corrosion Resistance

Specimens were exposed to salt water for 120 hours, 480 hours and 1000 hours, respectively, in a salt spray test under JIS Z 2371. The meanings of the symbols in Table 3 are as follows:

◉: No rust was observed over the entire length.
○: Rust was locally observed over the entire length, the rusted surface area being less than 10% of the entire surface area of the annular core.
Δ: Rust was locally observed over the entire length, the rusted surface area being not less than 10% and less than 30% of the entire surface area of the annular core.
X: Rust was locally observed over the entire length, the rusted surface area being not less than 30% of the entire surface area of the annular core.

(4) Resistance to Breakage at Welded Portions

The resistance to breakage at welded portions was determined in the same manner as in the determination of the resistance to breakage in Table 2. The meanings of the symbols are also the same except that where all of the 20 specimens remained broken, ◉ was used.

As is apparent from Table 4, annular cores made of an alloy steel having superior weldability and heat resistance and formed with a thick plating layer of an Al—Zn alloy or Zn, or annular cores made of stainless steel are less likely to be broken at welded portions, and can be formed into high-strength, corrosion-resistant bead cords. In particular, the cores which satisfy all of the requirements of the present invention (i.e. core Nos. 13, 14, 17, 18, 21, 22, 25, 26 and 29 to 32) scored high marks in all of the three evaluation categories. Thus, by using cords including these annular cores in vehicle tires, it is possible to obtain durable, high-performance tires.

What is claimed is:

1. An annular concentric-lay bead cord comprising an annular core and a wrap wire helically wrapped around said annular core in a single or a plurality of layers, said annular core being made of a medium carbon steel and having a diameter $d_C$ that satisfies the following relation with respect to the diameter $d_S$ of the wrap wire:

$$1.04 \leq d_C/d_S \leq 1.30$$

said wrap wire having a coil diameter $D_S$ which is 0.5 to 1.3 times diameter $D_C$ of an annular shape of the annular core, the coil diameter $D_S$ of the wrap wire being a coil diameter of the wrap wire while the wrap wire is coiled on a wire supply reel.

2. The annular concentric-lay bead cord of claim 1, where in said annular core is made of carbon steel containing 0.28 to 0.56 percent by weight of carbon.

3. An annular concentric-lay bead cord comprising an annular core and a wrap wire helically wrapped around said annular core in a single or a plurality of layers, said annular core being made of an alloy steel comprising 0.08 to 0.27 percent by weight of carbon, 0.30 to 2.00 percent by weight of silicon, 0.50 to 2.00 percent by weight of manganese, and 0.20 to 2.00 percent by weight of chromium, the balance being iron and impurities that may inevitably mix into the alloy, and having a diameter $d_C$ that satisfies the following relation with respect to the diameter $d_S$ of the wrap wire:

$$1.04 \leq d_C/d_S \leq 1.30$$

said wrap wire having a coil diameter $D_S$ which is 0.5 to 1.3 times diameter $D_C$ of an annular shape of the annular core, the coil diameter $D_S$ of the wrap wire being a coil diameter of the wrap wire while the wrap wire is coiled on a wire supply reel.

4. An annular concentric-lay bead cord comprising an annular core and a wrap wire helically wrapped around said annular core in a single or a plurality of layers, said annular core being made of an alloy steel comprising 0.08 to 0.27 percent by weight of carbon, 0.30 to 2.00 percent by weight of silicon, 0.50 to 2.00 percent by weight of manganese, and 0.20 to 2.00 percent by weight of chromium, and further containing at least one of 0.001 to 0.10 percent by weight of aluminum, 0.001 to 0.10 percent by weight of titanium, 0.001 to 0.10 percent by weight of niobium, 0.001 to 0.10 percent by weight of vanadium, 0.0003 to 0.10 percent by weight of boron, and 0.001 to 0.10 percent by weight of magnesium, the balance being iron and impurities that may inevitably mix into the alloy, and having a diameter $d_C$ that satisfies the following relation with respect to the diameter $d_S$ of the wrap wire:

$$1.04 \leq d_C/d_S \leq 1.30$$

said wrap wire having a coil diameter $D_S$ which is 0.5 to 1.3 times diameter $D_C$ of an annular shape of the annular core, the coil diameter $D_S$ of the wrap wire being a coil diameter of the wrap wire while the wrap wire is coiled on a wire supply reel.

5. An annular concentric-lay bead cord comprising an annular core and a wrap wire helically wrapped around said annular core in a single or a plurality of layers, said annular core being formed with a plating layer of an aluminum-zinc alloy, wherein said annular core is made of an alloy steel comprising 0.08 to 0.27 percent by weight of carbon, 0.30 to 2.00 percent by weight of silicon, 0.50 to 2.00 percent by weight of manganese, and 0.20 to 2.00 percent by weight of chromium, and further containing at least one of 0.01 to 1.00 percent by weight of molybdenum, 0.10 to 2.00 percent by weight of nickel, 0.10 to 2.00 percent by weight of cobalt, and 0.01 to 1.00 percent by weight of tungsten, and 0.001 to 0.10 percent by weight of at least one of aluminum, niobium, titanium and vanadium, the balance being iron and impurities that may inevitably mix into the alloy.

6. The annular concentric-lay bead cord of claim 5, wherein the aluminum-zinc alloy forming said plating layer contains 3.5 to 15 percent of aluminum.

7. The annular concentric-lay bead cord of claim 5, wherein said plating layer has a thickness of 1.0 to 35 micrometers.

8. An annular concentric-lay bead cord comprising an annular core and a wrap wire helically wrapped around said annular core in a single or a plurality of layers, said annular core being formed with a plating layer of an aluminum-zinc alloy, wherein said annular core is made of an alloy steel comprising 0.08 to 0.27 percent by weight of carbon, 0.30 to 2.00 percent by weight of silicon, 0.50 to 2.00 percent by weight of manganese, and 0.20 to 2.00 percent by weight of chromium, the balance being iron and impurities that may inevitably mix into the alloy.

9. The annular concentric-lay bead cord of claim 8, wherein the aluminum-zinc alloy forming said plating layer contains 3.5 to 15 percent of aluminum.

10. The annular concentric-lay bead cord of claim 8, wherein said plating layer has a thickness of 1.0 to 35 micrometers.

11. An annular concentric-lay bead cord comprising an annular core and a wrap wire helically wrapped around said annular core in a single or a plurality of layers, said annular core being formed with a plating layer of zinc, wherein said annular core is made of an alloy steel comprising 0.08 to 0.27 percent by weight of carbon, 0.30 to 2.00 percent by weight of silicon, 0.50 to 2.00 percent by weight of manganese, and 0.20 to 2.00 percent by weight of chromium, and further containing at least one of 0.01 to 1.00 percent by weight of molybdenum, 0.10 to 2.00 percent by weight of nickel, 0.10 to 2.00 percent by weight of cobalt, and 0.01 to 1.00 percent by weight of tungsten, and 0.001 to 0.10 percent by weight of at least one of aluminum, niobium, titanium and vanadium, the balance being iron and impurities that may inevitably mix into the alloy.

12. The annular concentric-lay bead cord of claim 11, wherein said plating layer has a thickness of 2.0 to 35 micrometers.

13. An annular concentric-lay bead cord comprising an annular core and a wrap wire helically wrapped around said annular core in a single or a plurality of layers, said annular core being formed with a plating layer of zinc, wherein said annular core is made of an alloy steel comprising 0.08 to 0.27 percent by weight of carbon, 0.30 to 2.00 percent by weight of silicon, 0.50 to 2.00 percent by weight of manganese, and 0.20 to 2.00 percent by weight of chromium, the balance being iron and impurities that may inevitably mix into the alloy.

14. The annular concentric-layer bead cord of claim 13, wherein said plating layer has a thickness of 2.0 to 35 micrometers.

* * * * *